(12) United States Patent
Bartlett (10) Patent No.: US 8,926,136 B2
(45) Date of Patent: Jan. 6, 2015

(54) WAVELENGTH CONVERSION APPARATUS

(71) Applicant: Texas Instruments Incorporated, Dallas, TX (US)

(72) Inventor: Terry A. Bartlett, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/946,118

(22) Filed: Jul. 19, 2013

(65) Prior Publication Data

US 2013/0308295 A1    Nov. 21, 2013

Related U.S. Application Data

(63) Continuation of application No. 13/037,339, filed on Feb. 28, 2011, now Pat. No. 8,496,352.

(60) Provisional application No. 61/308,626, filed on Feb. 26, 2010.

(51) Int. Cl.
*F21V 9/08* (2006.01)
*G03B 21/20* (2006.01)
*H04N 9/31* (2006.01)

(52) U.S. Cl.
CPC ............... *F21V 9/08* (2013.01); *G03B 21/204* (2013.01); *H04N 9/3111* (2013.01)
USPC ............. 362/259; 362/84; 362/323; 362/231; 362/293

(58) Field of Classification Search
USPC .......... 362/84, 319, 323, 325, 230, 231, 259, 362/293
See application file for complete search history.

(56) References Cited

U.S. PATENT DOCUMENTS

| | | | |
|---|---|---|---|
| 7,066,605 B2 * | 6/2006 | Dewald et al. | 353/84 |
| 7,547,114 B2 | 6/2009 | Li et al. | |
| 7,651,243 B2 | 1/2010 | McGuire, Jr. et al. | |
| 7,726,861 B2 | 6/2010 | Xu | |
| 7,744,241 B2 | 6/2010 | Xu | |
| 2004/0057022 A1 * | 3/2004 | Song | 353/84 |
| 2006/0164606 A1 * | 7/2006 | Bhowmik | 353/84 |
| 2007/0019408 A1 | 1/2007 | McGuire, Jr. et al. | |
| 2010/0328626 A1 | 12/2010 | Miyazaki | |
| 2011/0149549 A1 | 6/2011 | Miyake | |

FOREIGN PATENT DOCUMENTS

JP   2011129406   6/2011
WO   WO 2012109168   8/2012

* cited by examiner

*Primary Examiner* — Jong-Suk (James) Lee
*Assistant Examiner* — Leah S Macchiarolo
(74) *Attorney, Agent, or Firm* — Jacqueline J. Garner; Frederick J. Telecky, Jr.

(57) ABSTRACT

A wavelength conversion device comprising a plurality of regions. Each region for absorbing radiant energy and emitting light having a characteristic dependent upon which region of the device emits the light.

32 Claims, 5 Drawing Sheets

WAVELENGTH CONVERSION APPARATUS

This application is a continuation of application Ser. No. 13/037,339 filed Feb. 28, 2011, which claims the benefit of Provisional Application No. 61/308,626 filed Feb. 26, 2010, the entireties of both of which are hereby incorporated by reference.

FIELD OF THE INVENTION

This invention relates to the field of optical components, more particularly to optical components that convert energy from one wavelength to another, more particularly optical components that convert energy from one wavelength to a visible wavelength, and display systems incorporating such wavelength conversion components.

BACKGROUND OF THE INVENTION

A variety of useful devices receive radiant energy in a first wavelength band and emit radiant energy in a different wavelength band. For example, periodically poled crystals, such as lithium niobate, are used to double the frequency of laser illumination and phosphors are deposited on the inside of cathode ray tubes to convert a stream of electrons into visible light.

One such wavelength converter is a phosphor color wheel that receives radiant energy and emits visible light. The phosphor color wheel is used to enable a solid state illuminator, such as a laser emitter, to replace the high pressure arc lamps traditionally used in projection displays. Solid state illuminators, such as light emitting diodes (LEDs) and laser emitters, have the potential to provide a very long lifetime and wider gamut compared to arc lamps.

Solid state illuminators, however, have drawbacks. The luminance, available flux within the etendue of a spatial light modulator (SLM), provided by an LED is limited, and high-power LEDs are difficult to cool in small packages. Laser sources have a very high luminance, but tend to create image speckle artifacts due to their extremely narrow bandwidth. Speckle artifacts are difficult and costly to eliminate in front projection display systems.

What is needed is low cost, efficient method of converting radiant energy from one wavelength band to another wavelength band in order to provide a long-life high-luminance illumination source that does not introduce any additional artifacts into the light beam.

SUMMARY OF THE INVENTION

Objects and advantages will be obvious, and will in part appear hereinafter and will be accomplished by the present invention which provides a method and system for wavelength conversion.

One embodiment of the claimed invention provides a method of converting radiant energy. The method comprises: directing a first radiant energy beam at a moving surface; absorbing a portion of the first radiant energy beam; emitting a second radiant energy beam, the second radiant energy beam having a characteristic dependent upon the composition of the moving surface, wherein different regions of the moving surface emit radiant energy having different characteristics; and moving the moving surface relative to the first radiant energy band such that the first radiant energy band impinges on different portions of the moving surface, wherein the regions are arranged in annular bands on the moving surface.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF EXAMPLE EMBODIMENTS

Figure 1:
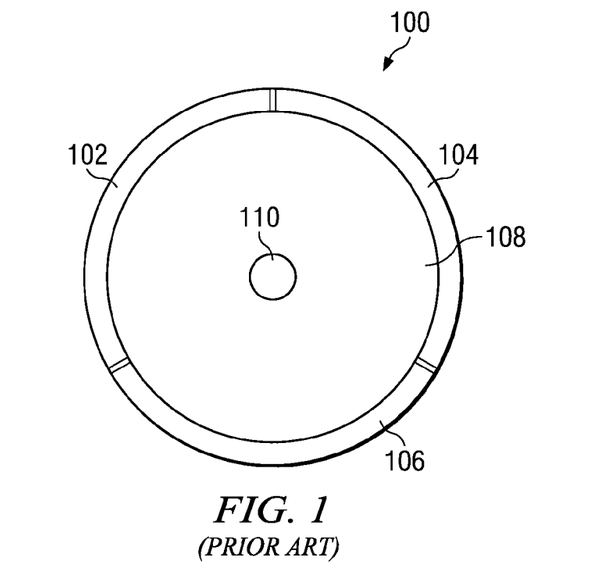
FIG. 1 is a plan view of a phosphor color wheel of the prior art.

FIG. 1 is a plan view of a typical phosphor-based color wheel 100 of the prior art. The wheel, is comprised of multiple color segments 102, 104, 106, each of which is used to generate light having a particular color as will be explained later. The color segments 102, 104, 106 are attached to a central hub 108 which has a central aperture 110 through which a shaft is attached to the color wheel 100.

While three segments are shown in FIG. 1, the color wheel 100 of FIG. 1 may include more segments. For example, many color wheels include a single segment for each of three primary colors such as red, green, and blue. Other color wheels include multiple segments for a single color—either adjacent to segments of the same color or separated by segments of another color. Color wheels may also include additional colors such as cyan, magenta, and yellow, and may provide segments intended to generate white light—often called white or clear segments. While three primary colors have traditionally been used in display systems, the term multi-primary is typically reserved for systems utilizing four or more primary colors.

Figure 2:
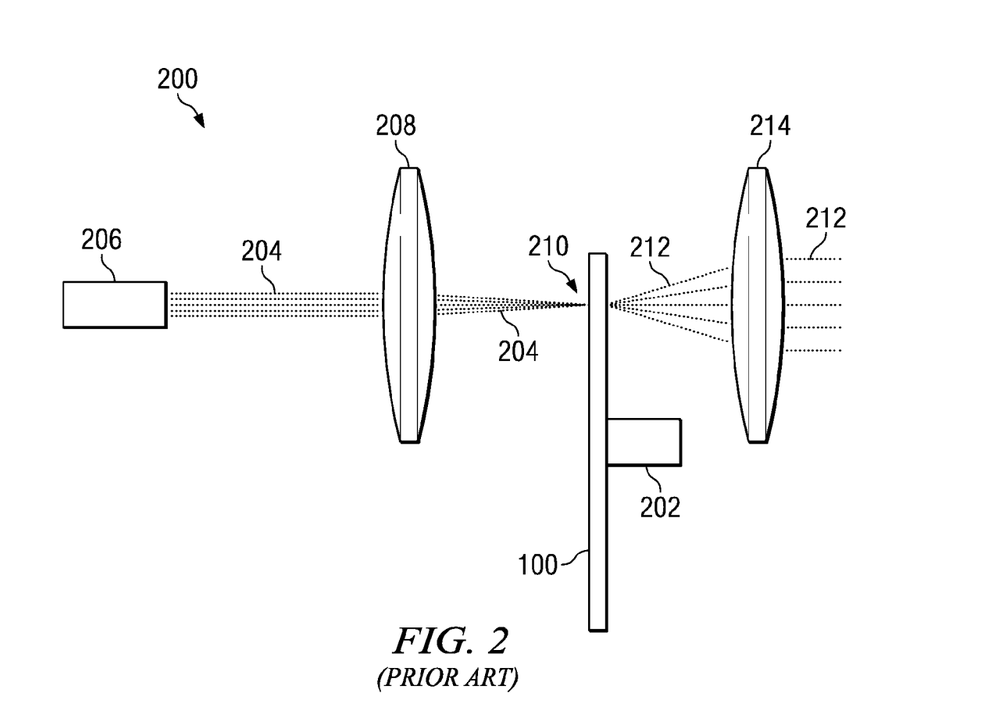
FIG. 2 is a schematic view of a illumination system using the color wheel of FIG. 1.

FIG. 2 illustrates the use of a typical phosphor-based color wheel 100 in an illumination system 200 of the prior art. The color wheel is mounted on a motor 202 by a shaft, or coupled to a motor by a belt, gear, or some other coupler to enable the motor 202 to turn the color wheel 100. The color wheel 100 is positioned in the path of a light beam 204 generated by a light source 206 and focused on the color wheel by an optical system 208. Light source 206 may be any source of radiant energy, and typically is one or more LEDs or lasers. While shown as a single lens, optical system 208 often is a lens system comprised of multiple lenses.

Light focused on the phosphor-based color wheel 100 at point 210 excites phosphors in or on the color wheel. As described in U.S. Pat. No. 7,547,114 B2, issued 16 Jun. 2009 to Li et al. and entitled Multicolor Illumination Device Using Moving Plate With Wavelength Conversion Materials, U.S. Pat. No. 7,726,861 B2, issued 1 Jun. 2010 to Xu and entitled Brightness Enhancement With Directional Wavelength Conversion, and U.S. Pat. No. 7,744,241 B2, issued 29 Jun. 2010 to Xu and entitled High Brightness Light Source Using Light Emitting Devices Of Different Wavelengths And Wavelength Conversion, various phosphors may be applied on a substrate to enable a conversion from one wavelength band to another wavelength band. While this disclosure will discuss the phosphors as being applied to the substrate or located on the substrate, it is understood that this includes phosphors that are embedded in the substrate or applied to a back surface of the substrate or sandwiched between layers of the substrate.

The phosphor color wheel absorbs energy from the illumination beam 204 and reemits the beam 212 on the other side of the wheel. The emitted beam 212 may be collected and focused or collimated by optics 214.

The illumination beam 204 and the emitted beam 212 have different wavelengths at least a portion of the time. For example, segment 102 may include red phosphors—or phosphors that emit light in what is perceived by humans as red light—while segments 104 and 106 include green and blue phosphors respectively. If laser 206 emits blue light 204, when the red segment 102 is in the light path the red phosphors will absorb the blue laser light and reemit red light 212. When the green segment 104 is in the light path the green phosphors will absorb the blue laser light and reemit green light 212. When the blue segment 106 is in the light path the blue phosphors will absorb the blue laser light and reemit blue light 212.

While the illumination system of FIG. 2 provides an efficient method and system for generating light of various colors, when used in a display system it has serious disadvantages. For example, while the use of solid state light sources such as LEDs or lasers provides an efficient source of radiant energy to stimulate the phosphors, the use of a segmented color wheel constrains the display system to the use of single color display periods that are determined by the relative sizes of the various color segments 102, 104, 106. As such, no matter the color needs of the image being generated, a display system using a segmented color wheel 100 can only devote a portion of time to a particular color that is determined by the size of a particular color filter relative to the sizes of the remaining color filters as it is generally necessary to rotate the wheel at a constant velocity.

Figure 3:
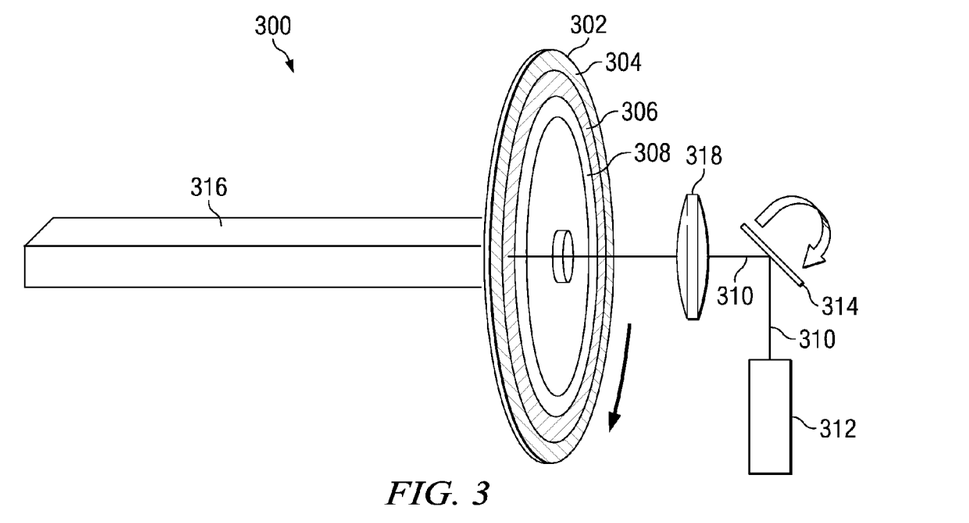
FIG. 3 is a schematic view of an illumination system according to one embodiment of the present invention.

The new color wheel design and illumination system 300 shown in FIG. 3 overcomes this limitation. The color wheel 302 of FIG. 3 includes multiple tracks for bands 304, 306, 308 around the color wheel rather than radial segments. These tracks enable the beam of radiant energy 310 produced by source 312 to stimulate the phosphors on any given track for any proportion of the time. This enables the improved color wheel 302 to be used in illumination systems 300 that provide primary color periods having durations that vary relative to one another, generally based on the color needs of an image being generated or on the illumination capabilities of the source 312 and phosphors used to convert the source radiant energy 310. For example, a bluish image may increase the relative time the radiant energy 310 lingers on a blue phosphor band compared to a yellow or red band.

Because the illumination system of FIG. 3 does not include radial spokes, a mechanism for moving the beam of radiant energy 310 onto different segments of the color wheel 302 is used. This mechanism may include a servo or other mechanism to move the color wheel itself relative to the radiant energy beam 310, or a mechanism to move the beam relative to the color wheel. As shown in FIG. 3, a tilting mirror 314 may be used to direct the radiant energy 310 from one track to another on the color wheel.

In systems that move the beam relative to a stationary spinning color wheel, the light beam reemitted by the wheel also moves relative to the wheel. In the example shown in FIG. 3, an optional integrator rod 316 is used to collect the light from all three of the phosphor tracks. The integrator rod collects the reemitted light and emits the reemitted light from a far end of the integrator light. Most of the light passing through the integrator rod reflects from the integrator rod several times as it passes through the integrator rod such that light passing through the exit of the integrator rod 316 is homogenized.

A controller, not shown, activates the tilting mirror 314 to select which of the phosphor tracks is impinged by the radiant energy 310 from the source 312. The controller may sequentially alternate between all of the tracks, may select only a single track, or may alternate between a subset of the tracks. The duration each track is illuminated may be equal or unequal compared to the duration other tracks are illuminated. The controller may also alter the intensity of the radiant energy 310 produced by the source 312 during or between the illumination periods for each track depending on the intensity needs of the illumination system.

In the system of FIG. 3 and the following figures and embodiments, the source 312 may produce a visible or invisible beam of radiant energy 310. For example, the beam of radiant energy 312 may be ultraviolet light, infrared light, visible light, microwave energy, a beam of electrons, or any other suitable beam of radiant energy.

In the system of FIG. 3 and the following figures and embodiments, the color wheel may be wheel shaped, or may have other shapes. For example, the color wheel may be drum shaped or formed on a belt. The term color wheel and the illustration of the color wheel are selected only because a disc-shaped color wheel is the most popular embodiment used in contemporary filter color wheel based display systems and those skilled in the art are familiar with existing color wheels.

In the system of FIG. 3 and the following figures and embodiments, the color wheels illustrated as transmissive color wheels may be reflective instead, and vice-versa. The addition of a reflective surface to a far side of a color wheel may be used to convert a transmissive color wheel into a reflective color wheel. The reflective surface may reflect all or only some of the wavelengths of interest in the illumination system. For example, if a blue laser source is used, it may be desired to allow the blue light to pass through the wheel while reflecting light from some or all of the other portions of the visible light spectrum. The reflective surface may be a portion of the moving color wheel—in which case the wheel truly is reflective, or may be an independent or stationary reflector positioned by the color wheel.

In the system of FIG. 3 and the following figures and embodiments, the color wheel is illustrated and discussed as having multiple tracks of different colors. It should be understood that one or more of the tracks may be devoid of significant phosphors such that the radiant energy used to illuminate the track is not significantly converted by the phosphors. For example, if the source 312 produces radiant energy 310 in a wavelength band that is useful for the illumination system, one or more tracks of the color wheel may be clear in order to allow the radiant energy to pass through the color wheel without conversion.

In the system of FIG. 3 and the following figures and embodiments, optics 318 is illustrated as a single refractive lens. It should be understood that the illustration of the optics 318 or other optical components as a single refractive lens is to simplify the illustration and is not a limitation of the system unless otherwise stated. Optics 318 may be comprised of more than one optical element and each optical element may be refractive, diffractive, reflective, or any other type of optical element, with or without optical power.

In the system of FIG. 3 and the following figures and embodiments, the order or placement of the various optical components is illustrated schematically for purposes of illustration only and should not be considered as limiting. For example, the relative locations of the tilting mirror 314 and optics 318 may be interchanged or the tilting mirror 314 may be placed between individual elements of the optics 318. Likewise, the integrator rod may be placed before the color wheel or after the color wheel. As the phosphors are generally dispersive, the integrating rod may not be used in some embodiments. An integrating rod is useful, however, to collect light as emitted from various tracks of the color wheel. As the reemission of the energy from the phosphor wheel takes a finite amount of time, the color wheel emits light from an elongated area of the color wheel. The shape and location of the elongated strip depends on the speed of the color wheel, the decay period of the phosphors, and the energy level used to excite the phosphors.

The tilting mirror 314 of FIG. 3 may be a gimbaled mirror or an array of gimbaled mirrors. The tilting mirror may also be a single tilting mirror such a scanning mirror used in scanning displays and printers, or an array of such scanning mirrors.

Figure 4:
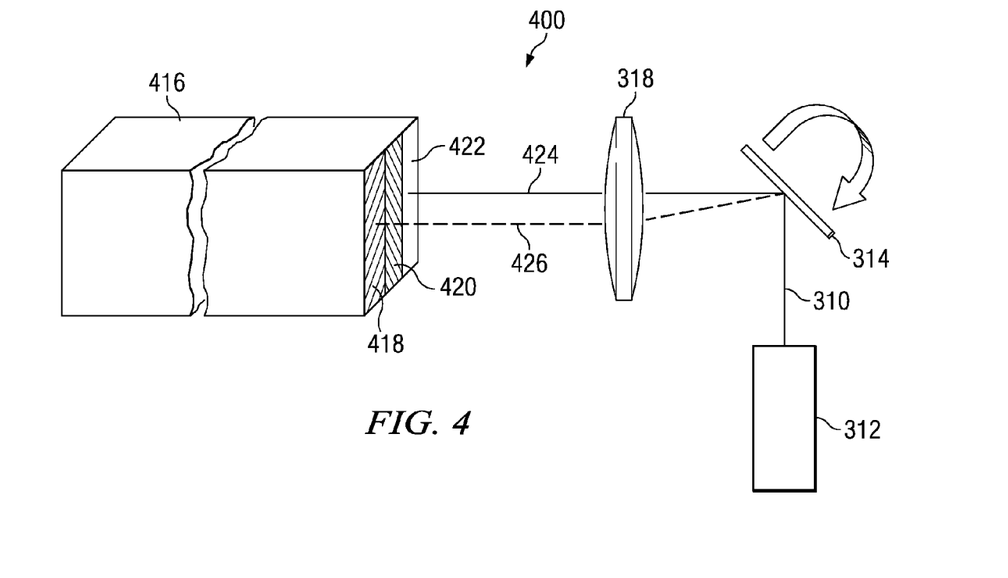
FIG. 4 is a schematic view of an illumination system according to another embodiment of the present invention.

FIG. 4 illustrates an illumination system 400 according to another embodiment of the present invention. In FIG. 4, radiant energy 310 from the source 310 is once again deflected by the tilting mirror 314 through optics 318 to an integrating rod 416. In this embodiment, however, an input face of the integrating rod 416 includes multiple regions 418, 420, 422 on which various phosphors have been deposited. Each region on the input face of the integrating rod performs a similar function to the function of the color wheel in FIG. 3—the conversion of the input radiant energy 310 to a beam of energy in a desired wavelength or the passing of the radiant energy 310.

As shown in FIG. 4, the tilting mirror 314 may be used to direct the radiant energy 310 to each individual region of the integrating rod. For example, path 424 illustrates the radiant energy being applied to a center region 420 on the input face of the integrating rod 416 while path 426 illustrates the radiant energy being applied to another region 418 of the input face.

In additional to the motion shown in FIG. 4 that moves the source beam of radiant energy from one region of the input face of the integrating rod to another region of the input face of the integrating rod, it may be desired to move the point at which the radiant energy 310 impinges on the input face in order to prevent excessive localized heating of the phosphors or the input face or coatings on the input face. It is expected that radiant energy 310 impinging on the input face will have a great enough power level to damage or destroy the phosphor coatings on the input face of the integrating rod 416. Embodiments using an actual color wheel generally spin the color wheel fast enough to avoid the localized heating that can destroy the coatings. Embodiments using color wheels may introduce additional motion of the input beam, generally in a direction perpendicular to the rotational direction relative to the beam at the point where the beam illuminates the wheel. The motion across a particular region of the input face of the integrator rod may be linear, circular, elliptical, random, vibratory, or follow a Lissajous or any other pattern. The rotation speed of the color wheel and the movement of the beam across a particular region are for purposes of cooling, providing uniformity, and to prevent damage to the coatings. Thus, the rotation speed or movement within a given track or region is independent to the frame rate of a display system using the illumination system. This allows the wheel or tilt mirror to operate at speeds much lower as well as much faster than the speeds required by a traditional color wheel and allows the noise generated by the movement to not only be reduced, but also to be generated at frequencies outside the hearing of a human—which can result in significantly quieter operation.

Figure 5:
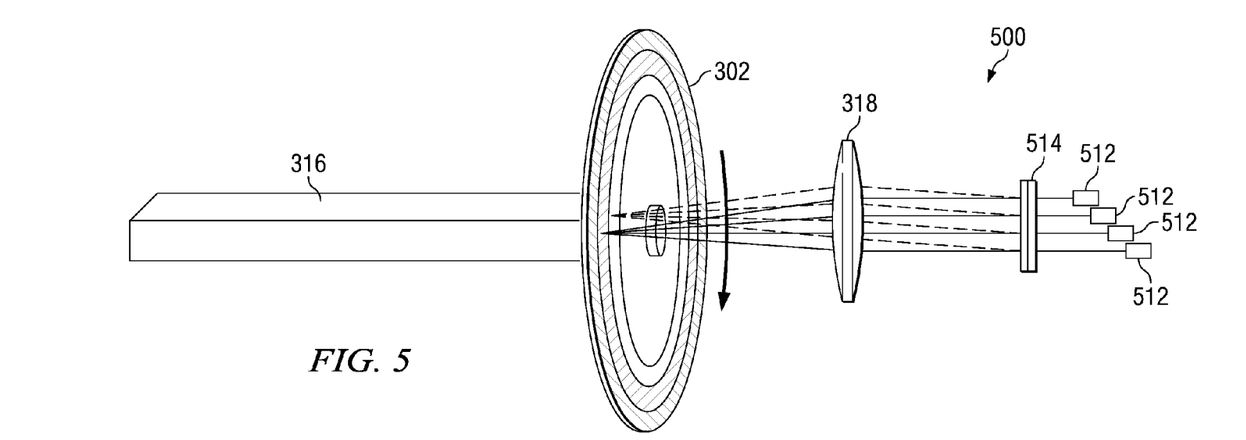
FIG. 5 is a schematic view of an illumination system according to another embodiment of the present invention.

FIG. 5 is a schematic view of an illumination system according to another embodiment of the present invention. In FIG. 5, multiple sources 512 are used to generate multiple source beams of radian energy. The multiple sources may each produce a beam of radiant energy in the same wavelength or band of wavelengths, or they may produce beams of radiant energy in different bands. The multiple source may operate simultaneously or sequentially or any combination thereof. The beam of radiant energy from each of the multiple source or groups of the multiple sources or any combination thereof may be directed toward individual tracks on the phosphor based color wheel 302 such that activation of a particular source or sources stimulates the phosphors of a different color.

The use of multiple source directed to the multiple tracks or regions on the color conversion device allows the elimination of a tilting mirror or other mechanism to direct the radiant energy to a particular track.

Embodiments utilizing multiple sources 512 to generate additional power may utilize a tilting mirror as shown in other embodiments. The tilting mirror shown in other embodiments may also be replaced, in the embodiment of FIG. 5, the embodiments shown in FIGS. 3 and 4, and other embodiments, by an acousto-optical modulator, Bragg filter, switchable Bragg grating, holographic modulator, or other device as illustrated by modulator 514.

Modulator 514 may be controlled to direct the radian energy from one or more of the sources 512 to one or more of the tracks on the color wheel 302.

Figure 6:
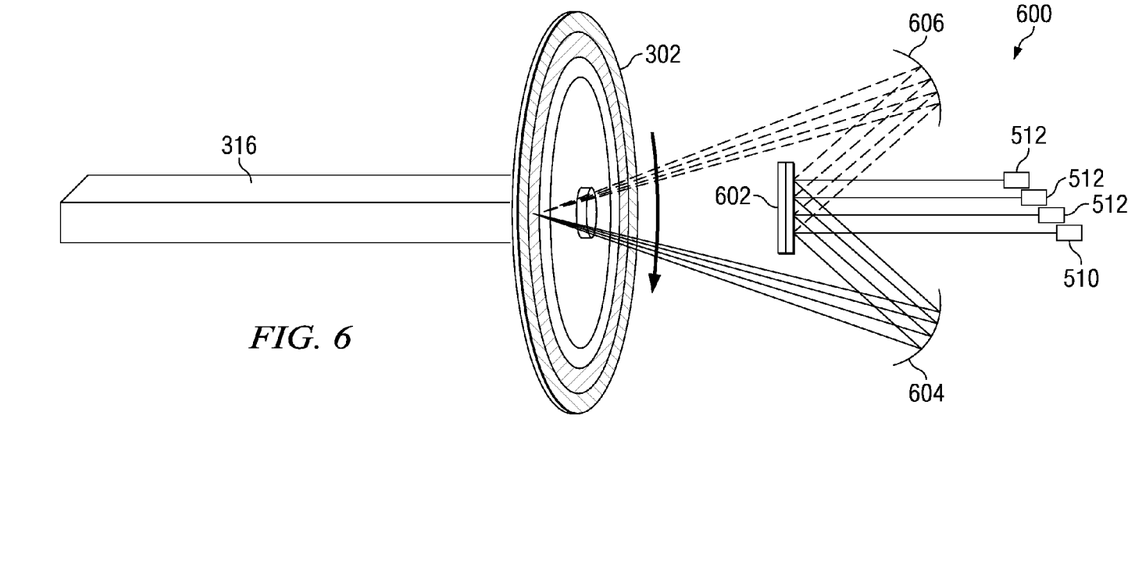
FIG. 6 is a schematic view of an illumination system according to another embodiment of the present invention.

FIG. 6 is a schematic view of yet another embodiment of the present invention illustrating the use of a color wheel having tracks instead of radial segments. In FIG. 6, the modulator 602 directs the source radiant energy along one or more multiple paths to reflectors 604 and 606 which direct the radiant energy to the color wheel 302. Modulator 602 may be a modulator as described in FIG. 5, or it may be a scanning mirror, a tilt mirror, or an array of mirrors such as a micromirror device. A digital micromirror device may be used in this embodiment in a bistable manner to direct light to one or the other of the reflectors 604 and 606. Separate regions, or interleaved regions, of the micromirror array may also be activated in opposite directions to direct different portions of the incident radiant energy to one or the other or both of the reflectors.

While FIG. 6 illustrates the use of two separate reflectors, both located in the plane of the drawing, it should be understood that the reflectors may be regions of the same reflector, may be situated on the same side of the path of incident radiant energy, there may be more than two reflectors, and the reflectors may be positioned in any position in three-dimensions.

The modulators and reflectors shown in FIG. 6 and the various embodiments described herein may include coatings designed to modify or limit the band of radiant energy. Likewise, the color wheel or the integrating rod may also have coatings to modify or limit the band of radiant energy allowed to pass through the illumination system.

Figure 7:
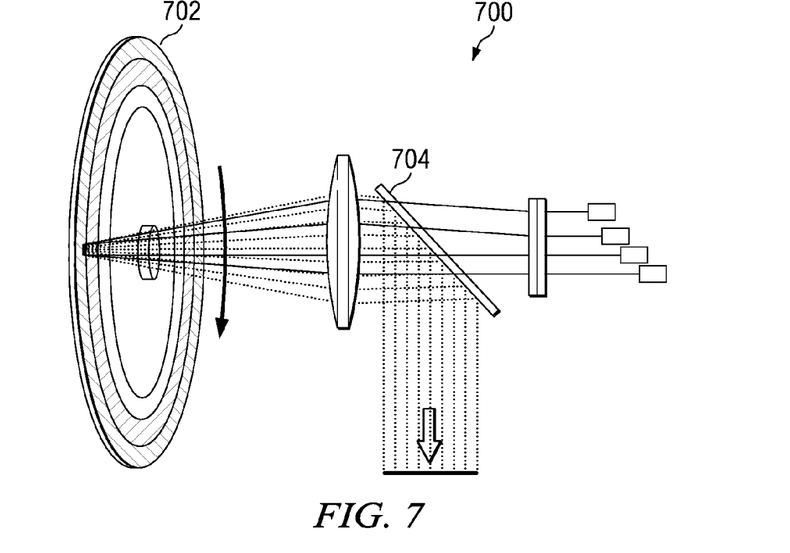
FIG. 7 is a schematic view of an illumination system according to another embodiment of the present invention.
Figure 8:
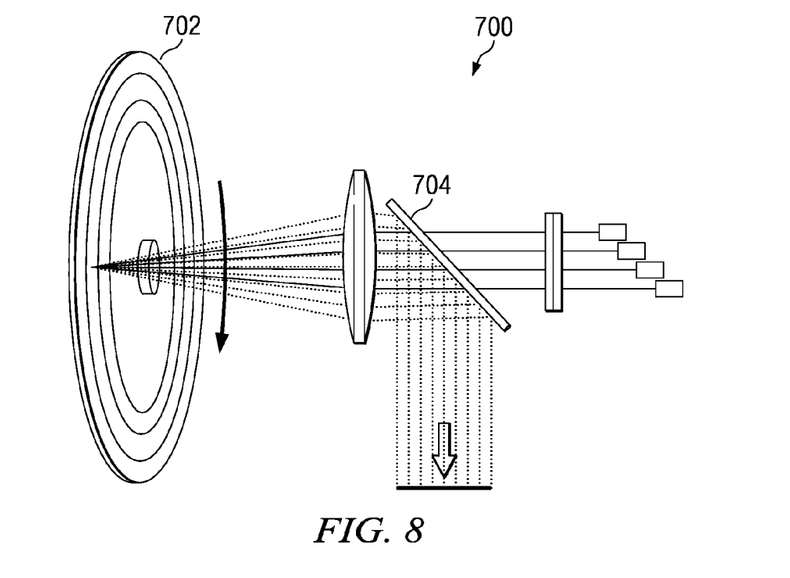
FIG. 8 is a schematic view of an illumination system according to another embodiment of the present invention.

FIG. 7 is a schematic view of one embodiment of the illumination system 700 using a reflective color wheel 702. Radiant energy from the illumination sources impinges on the reflective color wheel 702 where it is absorbed and reemitted as radiant energy in another band of wavelengths. The incident illumination is shown by beams from the sources while the reflected beam is shown as a dispersed beam. A dichroic splitter 704 is used to reflect one of the incident and reflected beams while passing the other of the incident and reflected beams. In FIG. 7, the incident beam is passed through the dichroic splitter while the beam reemitted by the reflective wheel is reflected by the dichroic splitter. FIG. 8 shows the system of FIG. 7 at another point in time when the beams are directed to another track of the color wheel 702. The beams may be directed between the tracks by any of the methods discussed above.

Figure 9:
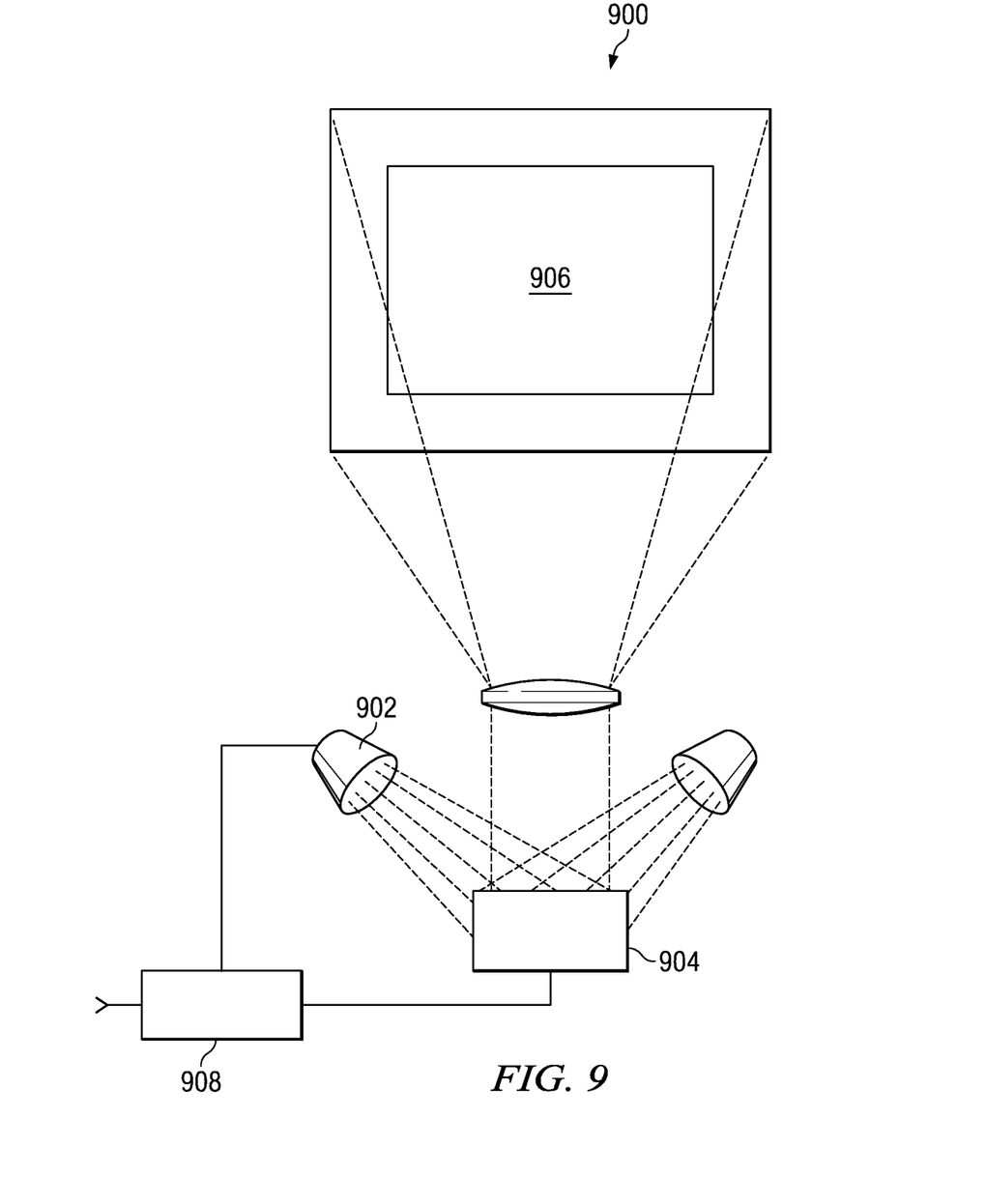
FIG. 9 is a schematic view of a projection display system utilizing an improved illumination system according to one embodiment of the present invention.

FIG. 9 is a schematic view of a display system 900 utilizing the illumination systems 902 described above. Light from the illumination system 902 is directed to a transmissive or reflective spatial light modulator 904, such as a liquid crystal on silicon or micromirror modulator. The modulator and illumination system are controlled by controller 908 which also received image data describing a desired image to be produced. The spatial light modulator 904 modulates the incoming beam of light from the illumination system to form an image on image plane 906. Some spatial light modulators absorb the light not used to form the image, some spatial light modulators transmit the unused light in a different direction to a different location such as the optical dump shown in FIG. 9.

Thus, although there has been disclosed to this point a particular embodiment for a wavelength converter and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. Apparatus for converting radiant energy comprising:
   a rotatable substrate; the rotatable substrate having a first annular band of a first color second radiant energy beam emitting material applied at a first radius and a second annular band of a different second color second radiant energy beam emitting material applied at a second radius different from the first radius;
   a source configured for directing a first radiant energy beam at the rotatable substrate; and
   a mechanism configured for moving the rotatable substrate radially relative to the first radiant energy beam such that the first radiant energy beam can be selectively directed to impinge on the first or the second annular band;
   the rotatable substrate, source and mechanism being relatively dimensioned and configured so that, when the substrate is rotated, the first color second radiant energy beam will be emitted when the first radiant energy beam is directed to impinge on the first annular band, and the different second color radiant energy beam will be emitted when the first radiant energy beam is directed to impinge on the second annular band.

2. The apparatus of claim 1, wherein first color and different second color second radiant energy beam emitting materials are different color light emitting phosphors.

3. The apparatus of claim 2, wherein the first and second annular bands are concentric rings of different color wavelength emitting phosphors.

4. The apparatus of claim 3, wherein the first radiant energy beam comprises a beam of laser light.

5. The apparatus of claim 4, wherein the beam of laser light is a beam of blue laser light.

6. The apparatus of claim 5, wherein the rings comprise a first ring of red light emitting phosphors and a second ring of green light emitting phosphors.

7. The apparatus of claim 6, wherein the regions further comprise a ring of blue light emitting phosphors.

8. The apparatus of claim 6, wherein moving the rotatable substrate relative to the first radiant energy beam comprises activating a tilting mirror to select which of the phosphor rings is impinged by the blue laser light.

9. The apparatus of claim 6, wherein moving the rotatable substrate relative to the first radiant energy beam comprises selectively energizing ones of multiple sources of beams respectively directed toward individual ones of the rings.

10. The apparatus of claim 6, wherein moving the rotatable substrate relative to the first radiant energy beam comprises directing the blue laser light using a digital micromirror device.

11. The apparatus of claim 1, wherein moving the rotatable substrate relative to the first radiant energy beam comprises selectively energizing ones of multiple sources of beams respectively directed toward individual ones of the rings.

12. The apparatus of claim 1, wherein moving the rotatable substrate relative to the first radiant energy beam comprises selectively energizing ones of multiple sources of beams respectively directed toward individual ones of the rings.

13. The apparatus of claim 1, wherein moving the rotatable substrate relative to the first radiant energy beam comprises directing the blue laser light using a digital micromirror device.

14. The apparatus of claim 1, wherein the rotatable substrate comprises a color wheel comprising a rotatable disc, the first and second annular bands are bands of photoluminescence material applied to the rotatable disc, and the second radiant energy beam is emitted by the photoluminescence material.

15. The apparatus of claim 14, wherein the first radiant energy beam comprises a beam of blue laser light, and the wheel is configured relative to a reflective surface to allow blue light to pass through the wheel while reflecting light from at least some of other color portions of the visible light spectrum.

16. The apparatus of claim 14, wherein the color wheel is configured for transmitting at least a portion of the second radiant energy beam emitted by the photoluminescence material.

17. The apparatus of claim 14, wherein the color wheel is configured for reflecting at least a portion of the second radiant energy beam emitted by the photoluminescence material.

18. Apparatus for converting radiant energy comprising:
   a rotatable color wheel; the color wheel having a first annular band of a first color light emitting phosphor applied at a first radius and a second annular band of a second color light emitting phosphor applied at a second radius different from the first radius;
   a source for directing laser light at an incidence point onto the color wheel; and
   a mechanism for displacing the incidence point radially relative to the color wheel;
   the color wheel, source and mechanism being relatively configured and dimensioned so that, when the color wheel is rotated, the incidence point of the laser light can be selectively radially displaced to cause corresponding selective emission of the first or second color light by respective laser light excitation of the first or second annular band phosphor.

19. The apparatus of claim 18, wherein the annular bands are concentric rings.

20. The apparatus of claim 19, wherein the first and second colors are red and green.

21. The apparatus of claim 20, wherein the mechanism comprises a movable mirror.

22. The apparatus of claim 21, wherein the source is a source for directing blue laser light onto the color wheel.

23. The apparatus of claim 22, wherein the color wheel further has a third annular band of blue color light emitting phosphor applied at a third radius, the third radius being different from the first and second radii; the color wheel, source and mechanism being relatively configured and dimensioned so that, when the color wheel is rotated, the incidence point of the laser light can be selectively radially displaced to cause corresponding selective emission of the first, second or third color light by respective laser light excitation of the first, second or third annular band phosphor.

24. The apparatus of claim 23, wherein the color wheel is configured relative to a reflective surface to allow blue light to pass through the wheel, while reflecting light from a least some of another color.

25. The apparatus of claim 23, wherein the color wheel is configured for transmitting at least a portion of the light emitted by the first, second or third annular band phosphor.

26. The apparatus of claim 23, wherein the color wheel is configured for reflecting at least a portion of the light emitted by the first, second or third annular band phosphor.

27. The apparatus of claim 18, wherein the mechanism comprises a movable mirror.

28. The apparatus of claim 18, wherein the source is a source for directing blue laser light onto the color wheel.

29. The apparatus of claim 28, wherein the color wheel is configured relative to a reflective surface to allow blue light to pass through the wheel, while reflecting light from a least some of another color.

30. The apparatus of claim 18, wherein the color wheel further has a third annular band of blue color light emitting phosphor applied at a third radius, the third radius being different from the first and second radii; the color wheel, source and mechanism being relatively configured and dimensioned so that, when the color wheel is rotated, the incidence point of the laser light can be selectively radially displaced to cause corresponding selective emission of the first, second or third color light by respective laser light excitation of the first, second or third annular band phosphor.

31. The apparatus of claim 30, wherein the color wheel is configured for transmitting at least a portion of the light emitted by the first, second or third annular band phosphor.

32. The apparatus of claim 30, wherein the color wheel is configured for reflecting at least a portion of the light emitted by the first, second or third annular band phosphor.

* * * * *